(12) United States Patent
Dutta et al.

(10) Patent No.: US 10,287,894 B2
(45) Date of Patent: May 14, 2019

(54) TURBINE COMPONENT AND METHODS OF MAKING AND COOLING A TURBINE COMPONENT

(71) Applicant: GENERAL ELECTRIC COMPANY, Schenectady, NY (US)

(72) Inventors: Sandip Dutta, Greenville, SC (US); James Zhang, Greenville, SC (US); Gary Michael Itzel, Simpsonville, SC (US); John McConnell Delvaux, Fountain Inn, SC (US); Matthew Troy Hafner, Honea Path, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 467 days.

(21) Appl. No.: 15/174,182

(22) Filed: Jun. 6, 2016

(65) Prior Publication Data

US 2017/0350259 A1 Dec. 7, 2017

(51) Int. Cl.
*F01D 5/18* (2006.01)
*B33Y 10/00* (2015.01)
(Continued)

(52) U.S. Cl.
CPC ............ *F01D 5/187* (2013.01); *B22F 3/1055* (2013.01); *B22F 3/24* (2013.01); *B23K 15/0086* (2013.01); *B23K 15/0093* (2013.01); *B23K 26/0006* (2013.01); *B23K 26/342* (2015.10); *B23K 26/70* (2015.10); *B33Y 10/00* (2014.12); *B33Y 80/00* (2014.12); *C23C 28/042* (2013.01); *F01D 5/147* (2013.01); *F01D 5/282* (2013.01);
(Continued)

(58) Field of Classification Search
CPC .......... F01D 5/282; F01D 5/147; F01D 5/187; F05D 2230/22; F05D 2240/122; F05D 2240/304; F05D 2260/204; B33Y 80/00
See application file for complete search history.

(56) References Cited

U.S. PATENT DOCUMENTS 6,514,046 B1 2/2003 Morrison et al.
7,645,122 B1 1/2010 Liang
(Continued)

OTHER PUBLICATIONS

Extended European Search Report and Opinion issued in connection with corresponding EP Application No. 17174357.8 dated Oct. 6, 2017.

*Primary Examiner* — Eldon T Brockman
(74) *Attorney, Agent, or Firm* — McNees Wallace & Nurick LLC

(57) ABSTRACT

A turbine component includes a root and an airfoil extending from the root to a tip opposite the root. The airfoil forms a leading edge and a trailing edge portion extending to a trailing edge. A plurality of nested cooling channels in the trailing edge portion of the airfoil permit passage of a cooling fluid from an interior of the turbine component to an exterior of the turbine component at the trailing edge portion. A method of making a turbine component includes forming an airfoil having a leading edge, a trailing edge portion extending to a trailing edge, and a plurality of nested cooling channels in the trailing edge portion. Each nested cooling channel fluidly connects an interior of the turbine component with an exterior of the turbine component at the trailing edge portion. A method of cooling a turbine component is also disclosed.

13 Claims, 4 Drawing Sheets

(51) Int. Cl.
- *B33Y 80/00* (2015.01)
- *B23K 26/342* (2014.01)
- *B23K 26/70* (2014.01)
- *B22F 3/105* (2006.01)
- *B22F 3/24* (2006.01)
- *B23K 15/00* (2006.01)
- *B23K 26/00* (2014.01)
- *C23C 28/04* (2006.01)
- *F01D 9/02* (2006.01)
- *F01D 25/12* (2006.01)
- *F01D 5/14* (2006.01)
- *F01D 5/28* (2006.01)
- *B23K 101/00* (2006.01)
- *B23K 103/08* (2006.01)

(52) U.S. Cl.
CPC .............. *F01D 9/02* (2013.01); *F01D 25/12* (2013.01); *B22F 2998/10* (2013.01); *B23K 2101/001* (2018.08); *B23K 2103/08* (2018.08); *F05D 2220/30* (2013.01); *F05D 2230/22* (2013.01); *F05D 2230/30* (2013.01); *F05D 2240/122* (2013.01); *F05D 2240/304* (2013.01); *F05D 2250/183* (2013.01); *F05D 2250/184* (2013.01); *F05D 2250/185* (2013.01); *F05D 2260/20* (2013.01); *F05D 2260/204* (2013.01); *F05D 2300/175* (2013.01); *F05D 2300/6033* (2013.01)

(56) References Cited

U.S. PATENT DOCUMENTS

| | | | |
|---|---|---|---|
| 8,235,670 B2* | 8/2012 | Morrison | F01D 5/147 29/889.72 |
| 8,790,083 B1 | 7/2014 | Liang | |
| 2003/0059577 A1 | 3/2003 | Morrison et al. | |
| 2005/0281673 A1 | 12/2005 | Draper et al. | |
| 2015/0107266 A1* | 4/2015 | Gustafson | F01D 5/02 60/805 |
| 2016/0023275 A1* | 1/2016 | Propheter-Hinckley | B22F 3/1055 416/96 A |
| 2016/0082547 A1* | 3/2016 | Szwedowicz | B22F 3/1055 700/98 |

\* cited by examiner

US 10,287,894 B2

TURBINE COMPONENT AND METHODS OF MAKING AND COOLING A TURBINE COMPONENT

STATEMENT REGARDING FEDERALLY SPONSORED RESEARCH

This invention was made with Government support under contract number DE-FE0024006 awarded by the Department of Energy. The Government has certain rights in the invention.

FIELD OF THE INVENTION

The present embodiments are directed to methods and devices for cooling the trailing edge of a turbine airfoil. More specifically, the present embodiments are directed to nested cooling channels along the trailing edge of an airfoil of a turbine component.

BACKGROUND OF THE INVENTION

Modern high-efficiency combustion turbines have firing temperatures that exceed about 2000° F. (1093° C.), and firing temperatures continue to increase as demand for more efficient engines continues. Gas turbine components, such as nozzles and blades, are subjected to intense heat and external pressures in the hot gas path. These rigorous operating conditions are exacerbated by advances in the technology, which may include both increased operating temperatures and greater hot gas path pressures. As a result, components, such as nozzles and blades, are sometimes cooled by flowing a fluid through a manifold inserted into the core of the nozzle or blade, which exits the manifold through impingement holes into a post-impingement cavity, and which then exits the post-impingement cavity through apertures in the exterior wall of the nozzle or blade, in some cases forming a film layer of the fluid on the exterior of the nozzle or blade.

The cooling of the trailing edge of a turbine airfoil is important to prolong its integrity in the hot furnace-like environment. While turbine airfoils are often made primarily of a nickel-based or a cobalt-based superalloy, turbine airfoils may alternatively have an outer portion made of one or more ceramic matrix composite (CMC) materials. CMC materials are generally better at handling higher temperatures than metals. Certain CMC materials include compositions having a ceramic matrix reinforced with coated fibers. The composition provides strong, lightweight, and heat-resistant materials with possible applications in a variety of different systems. The materials from which turbine components, such as nozzles or blades, are formed, combined with the particular conformations which the turbine components include, lead to certain inhibitions in the cooling efficacy of the cooling fluid systems. Maintaining a substantially uniform temperature of a turbine airfoil maximizes the useful life of the airfoil.

The manufacture of a CMC part typically includes laying up pre-impregnated composite fibers having a matrix material already present (prepreg) to form the geometry of the part (pre-form), autoclaving and burning out the pre-form, infiltrating the burned-out pre-form with the melting matrix material, and any machining or further treatments of the pre-form. Infiltrating the pre-form may include depositing the ceramic matrix out of a gas mixture, pyrolyzing a pre-ceramic polymer, chemically reacting elements, sintering, generally in the temperature range of 925 to 1650° C. (1700 to 3000° F.), or electrophoretically depositing a ceramic powder. With respect to turbine airfoils, the CMC may be located over a metal spar to form only the outer surface of the airfoil.

Examples of CMC materials include, but are not limited to, carbon-fiber-reinforced carbon (C/C), carbon-fiber-reinforced silicon carbide (C/SiC), silicon-carbide-fiber-reinforced silicon carbide (SiC/SiC), alumina-fiber-reinforced alumina ($Al_2O_3/Al_2O_3$), or combinations thereof. The CMC may have increased elongation, fracture toughness, thermal shock, dynamic load capability, and anisotropic properties as compared to a monolithic ceramic structure.

BRIEF DESCRIPTION OF THE INVENTION

In an embodiment, a turbine component includes a root and an airfoil extending from the root to a tip opposite the root. The airfoil forms a leading edge and a trailing edge portion extending to a trailing edge. A plurality of nested cooling channels in the trailing edge portion of the airfoil permit passage of a cooling fluid from an interior of the turbine component to an exterior of the turbine component at the trailing edge portion.

In another embodiment, a method of making a turbine component includes forming an airfoil having a leading edge, a trailing edge portion extending to a trailing edge, and a plurality of nested cooling channels in the trailing edge portion. Each nested cooling channel fluidly connects an interior of the turbine component with an exterior of the turbine component at the trailing edge portion.

In another embodiment, a method of cooling a turbine component includes supplying a cooling fluid to an interior of the turbine component. The turbine component includes a root and an airfoil extending from the root to a tip opposite the root. The airfoil forms a leading edge and a trailing edge portion extending to a trailing edge. The trailing edge portion has a plurality of nested cooling channels. The method also includes directing the cooling fluid through the nested cooling channels through the trailing edge portion of the airfoil. Each nested cooling channel fluidly connects the interior of the turbine component with an exterior of the turbine component at the trailing edge portion.

Other features and advantages of the present invention will be apparent from the following more detailed description, taken in conjunction with the accompanying drawings which illustrate, by way of example, the principles of the invention.

Figure 1:
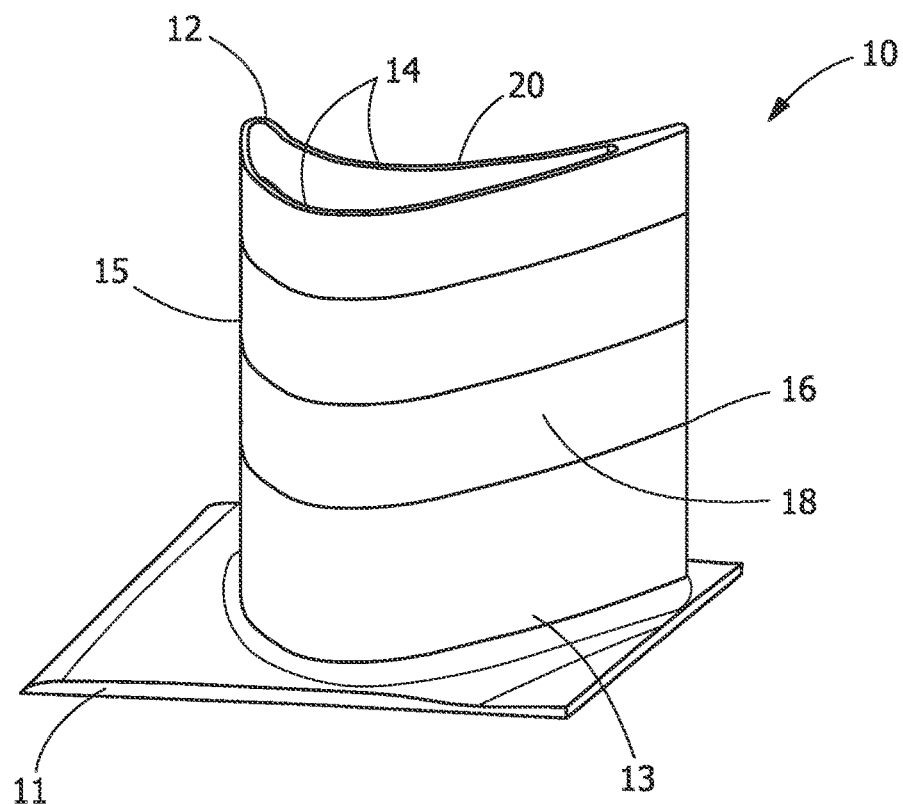
FIG. 1 is a schematic perspective side view of a turbine component in an embodiment of the present disclosure.
Figure 8:
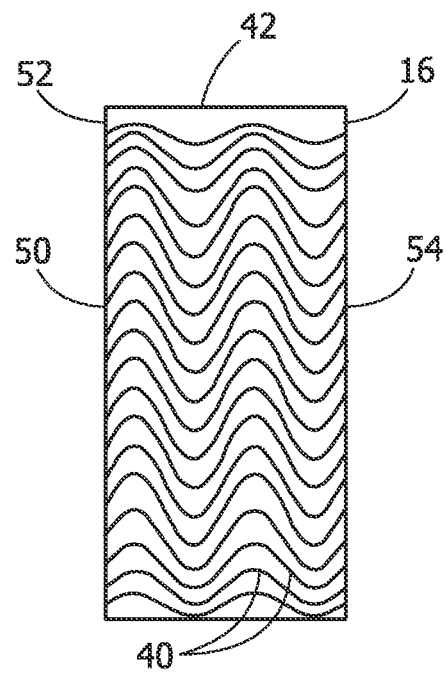

FIG. 8 is a schematic partial cross sectional view of the trailing edge portion of the turbine component of FIG. 1 showing a nested sinusoidal channel arrangement in an embodiment of the present disclosure.

Figure 9:
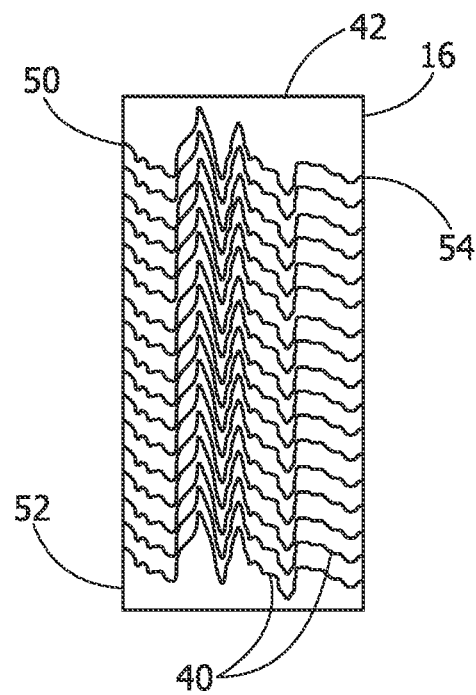

FIG. 9 is a schematic partial cross sectional view of the trailing edge portion of the turbine component of FIG. 1 showing a nested irregular channel arrangement in an embodiment of the present disclosure.

Figure 10:
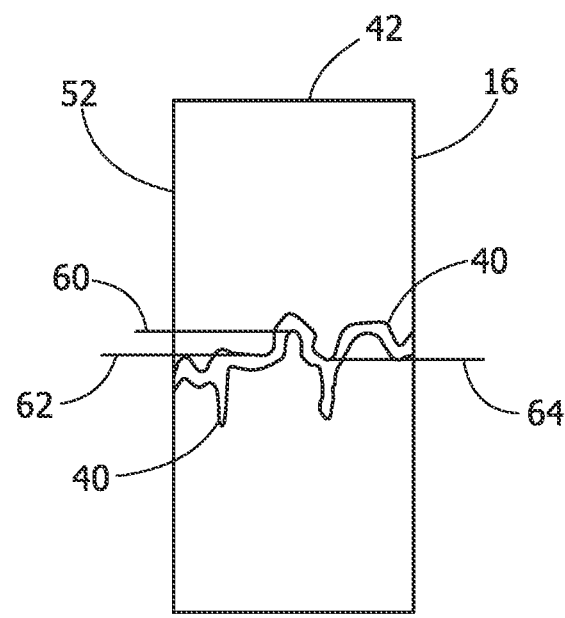

FIG. 10 is a schematic partial cross sectional view of the trailing edge portion of the turbine component of FIG. 1 showing two irregular channels in a nested arrangement in an embodiment of the present disclosure.

Wherever possible, the same reference numbers will be used throughout the drawings to represent the same parts.

DETAILED DESCRIPTION OF THE INVENTION

Provided is a method and a device for cooling the trailing edge of a turbine airfoil with nested cooling channels along the trailing edge of the turbine airfoil.

Embodiments of the present disclosure, for example, in comparison to concepts failing to include one or more of the features disclosed herein, provide cooling in a turbine airfoil, provide a more uniform temperature in a cooled turbine airfoil, provide a turbine airfoil with an enhanced lifespan, compensate at least in part for a blocked cooling channel by cooling with a neighboring cooling channel, or combinations thereof.

As used herein, a nested cooling channel refers to a cooling channel having at least one portion extending between two portions of a neighboring cooling channel contour. When cooling channels are nested, a hot gas streamline crosses more than one cooling channel.

As used herein, a trailing edge portion refers to a portion of an airfoil at the trailing edge without chambers or other void space aside from the cooling channels formed therein, as described herein.

Referring to FIG. 1, a turbine component 10 includes a root 11 and an airfoil 12 extending from the root 11 at the base 13 to a tip 14 opposite the base 13. In some embodiments, the turbine component 10 is a turbine nozzle. In some embodiments, the turbine component 10 is a turbine blade. The shape of the airfoil 12 includes a leading edge 15, a trailing edge 16, a suction side 18 having a convex outer surface, and a pressure side 20 having a concave outer surface opposite the convex outer surface. Although not shown in FIG. 1, the turbine component 10 may also include an outer sidewall at the tip 14 of the airfoil 12 similar to the root 11 at the base 13 of the airfoil 12.

Figure 2:
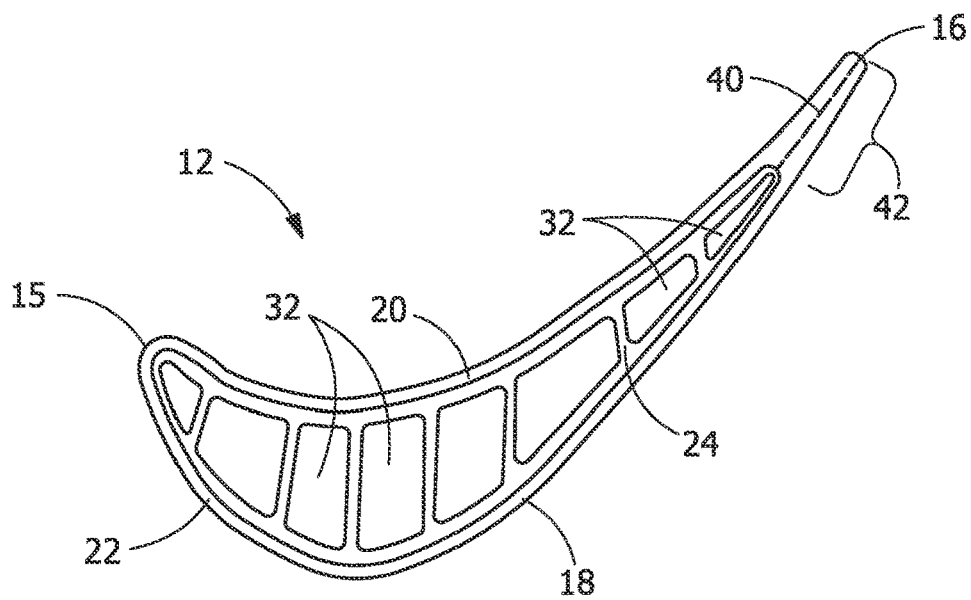
FIG. 2 is a schematic top view of the turbine component of FIG. 1 with a CMC outer layer.
Figure 3:
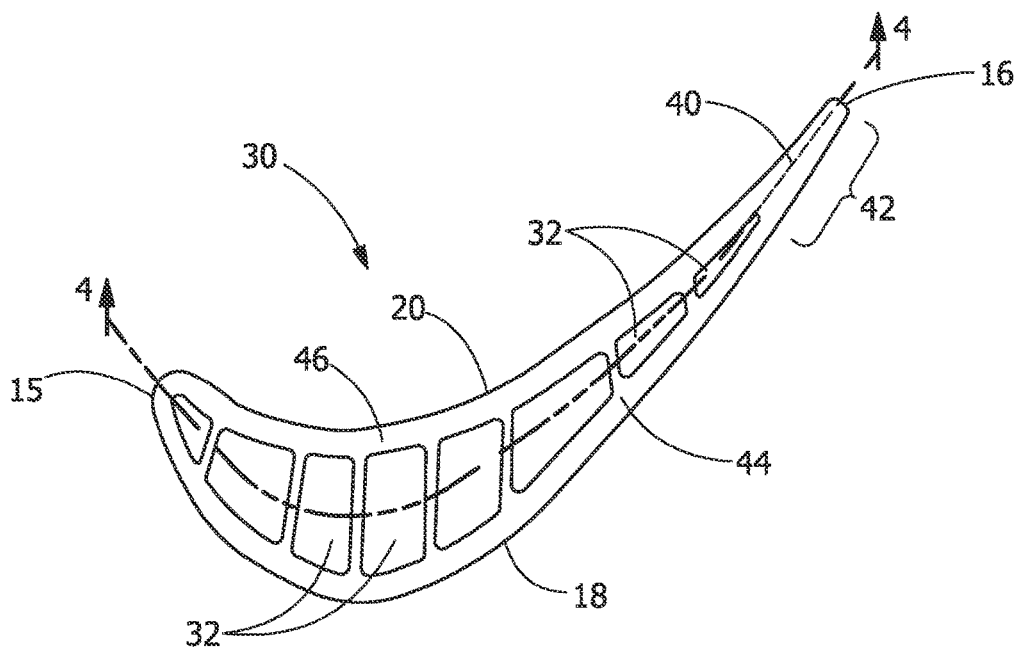
FIG. 3 is a schematic top view of the turbine component of FIG. 1 as a metal airfoil.

The generally arcuate contour of the airfoil 12 is shown more clearly in FIG. 2 and FIG. 3. Referring to FIG. 2, the airfoil 12 includes a ceramic matrix composite (CMC) shell 22 mounted on a metal spar 24. The airfoil 12 is formed as a thin CMC shell 22 of one or more layers of CMC materials over the metal spar 24. Referring to FIG. 3, the airfoil 12 is alternatively formed as a metal part 30. The metal part is preferably a high-temperature superalloy. In some embodiments, the high-temperature superalloy is a nickel-based high-temperature superalloy or a cobalt-based high-temperature superalloy.

In either case, the nested cooling channels 40 in the trailing edge portion 42 permit a cooling fluid supplied to the inner portion of the airfoil 12 to flow through the trailing edge portion 42 and out of the trailing edge portion 42 during operation of a turbine including the turbine component 10. The airfoil 12 also includes one or more chambers 32 to which cooling fluid may be provided by way of the root 11 or by way of the tip 14 of the turbine component 10.

Figure 4:
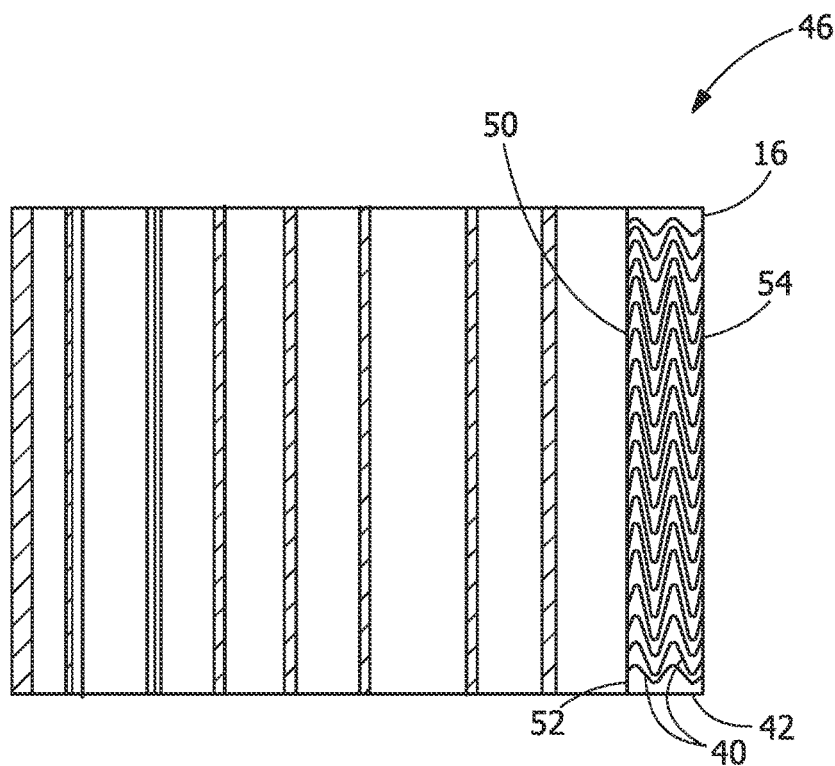
FIG. 4 is a schematic partial cross sectional view taken along line 4-4 of FIG. 3.

Referring to FIG. 4, the trailing edge portion 42 of the turbine component 10 includes the nested cooling channels 40 that open at a first end 50 at an interior surface 52 and a second end 54 opposite the first end 50 at or near the trailing edge 16 to provide passage of a cooling fluid in a generally axial direction from the interior to the exterior of the turbine component 10. The nested cooling channels 40 are preferably designed to be fluidly isolated from each other. In other words, each nested cooling channel 40 is preferably only open at the first end 50 and the second end 54 and is fluidly isolated from neighboring nested cooling channels 40.

Figure 5:
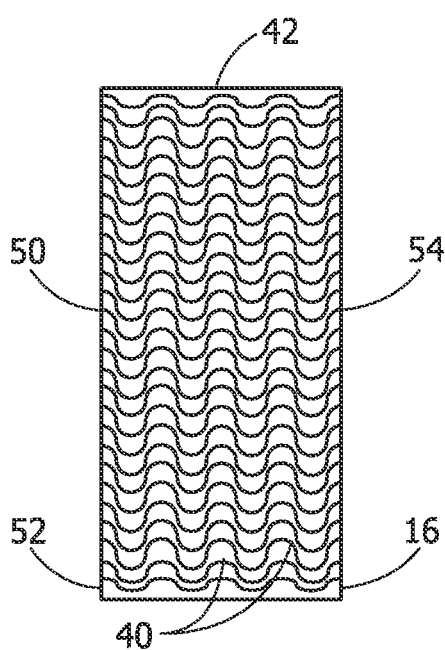
FIG. 5 is a schematic partial cross sectional view of the trailing edge portion of the turbine component of FIG. 1 showing a nested wavy channel arrangement in an embodiment of the present disclosure.
Figure 6:
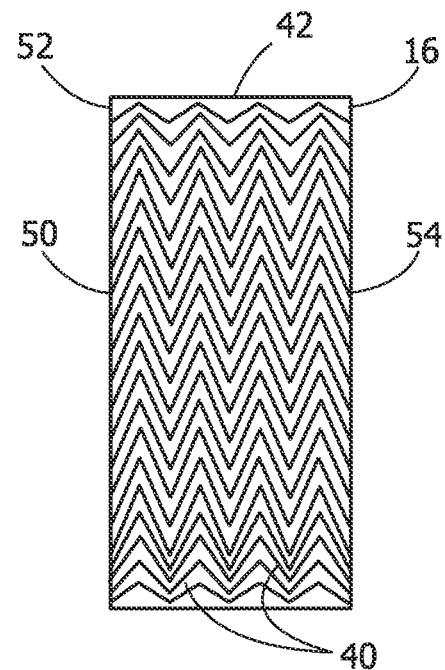
FIG. 6 is a schematic partial cross sectional view of the trailing edge portion of the turbine component of FIG. 1 showing a nested zigzag cooling channel arrangement in an embodiment of the present disclosure.
Figure 7:
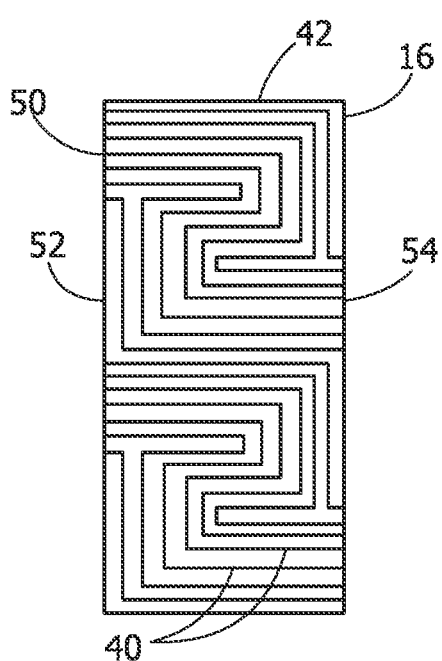
FIG. 7 is a schematic partial cross sectional view of the trailing edge portion of the turbine component of FIG. 1 showing a nested serpentine cooling channel arrangement in an embodiment of the present disclosure.

The nested cooling channels 40 in the trailing edge portion 42 may have any nested geometry, including, but not limited to, a wavy contour as shown in FIG. 5, a zigzag contour as shown in FIG. 6, a serpentine contour as shown in FIG. 7, a sinusoidal contour as shown in FIG. 8, or combinations thereof. In some embodiments, the nested cooling channels 40 at or near the upper or lower edges of the trailing edge portion 42 may have a different pattern than the nested cooling channels 40 in the center portion of the trailing edge portion 42 in order to provide more cooling at or near the upper and lower edges, as shown in FIG. 5 through FIG. 8. The two ends 50, 54 of each nested cooling channel 40 may be at the same radial height, as shown in FIGS. 5, 6, and 8, or the two ends 50, 54 of a nested cooling channel 40 may be at different radial heights, as shown in FIG. 7.

In some embodiments, the nested cooling channels 40 in the trailing edge portion 42 have an irregular contour, as shown in FIG. 9 and FIG. 10. Each nested cooling channel 40 may have the same irregular contour as shown in FIG. 9, or each nested cooling channel 40 may have a different irregular contour as shown in FIG. 10. An irregular contour may be any non-repeating contour, such as, for example, a random contour. Referring to FIG. 10, the lower nested cooling channel 40 is nested with respect to the upper nested cooling channel 40, because at least one portion of the lower nested cooling channel 40 extends to a radial height 60 above the radial heights 62, 64 of two portions of the upper nested cooling channel 40 on either side of that nested portion of the lower nested cooling channel 40.

When the airfoil 12 includes a CMC shell 22, at least a portion of the nested cooling channels 40 may be formed between layers of the CMC material. In some embodiments, all of the nested cooling channels 40 are formed between CMC layers. In some embodiments, the nested cooling channels 40 are formed by machining the CMC material after formation of the CMC material. In other embodiments, a sacrificial material is burned or pyrolyzed out either during or after formation of the CMC material to form the nested cooling channels 40.

When the airfoil 12 is formed as a metal part 30, the metal part may be formed by casting or alternatively by metal three-dimensional (3D) printing. In some embodiments, the metal part 30 is formed as two metal pieces that are brazed or welded together, such as, for example, along line 4-4 of FIG. 3. In such embodiments, the two pieces are a first section 44 including the suction side 18 having the convex outer surface and a second section 46 including the pressure side 20 having the concave outer surface, with at least a portion of the nested cooling channels 40 being formed at one or both of the surfaces of the sections 44, 46. In some embodiments, all of the nested cooling channels 40 are formed at the surface of the sections 44, 46. In other embodiments, the metal part 30 may be formed as a single piece by metal 3D printing.

Metal 3D printing enables precise creation of a turbine component 10 including complex nested cooling channels 40. In some embodiments, metal 3D printing forms successive layers of material under computer control to create at least a portion of the turbine component 10. In some embodiments, powdered metal is heated to melt or sinter the powder to the growing turbine component 10. Heating methods may include, but are not limited to, selective laser sintering (SLS), direct metal laser sintering (DMLS), selective laser melting (SLM), electron beam melting (EBM), and combinations thereof. In some embodiments, a 3D metal printer lays down metal powder, and then a high-powered laser melts that powder in certain predetermined locations based on a model from a computer-aided design (CAD) file. Once one layer is melted and formed, the 3D printer repeats the process by placing additional layers of metal powder on top of the first layer or where otherwise instructed, one at a time, until the entire metal component is fabricated.

The nested cooling channels 40 are preferably formed in the trailing edge portion 42 of the airfoil 12 to permit passage of a cooling fluid to cool the trailing edge portion 42. The nested cooling channels 40 may have any contour that increases the path length of the nested cooling channels 40 and provides nesting of neighboring nested cooling channels 40, including, but not limited to, wavy, zigzag, serpentine, sinusoidal, irregular, or combinations thereof. The nesting preferably compensates, at least in part, for any incidental blockage of one nested cooling channel 40 in that the neighboring nested cooling channels 40 may continue to provide cooling fluid on either side of the blocked nested cooling channel 40.

In some embodiments, the dimensions, contours, and/or locations of the nested cooling channels 40 are selected to permit cooling that maintains a substantially uniform temperature in the trailing edge portion 42 during operation of a turbine including the turbine component 10. The cross section of a nested cooling channel 40 may have any shape, including, but not limited to, a round shape, an elliptical shape, a racetrack shape, and a parallelogram. The size and shape of the cross section of the nested cooling channel 40 may vary from the first end 50 to the second end 54, depending on the local cooling effectiveness required of the nested cooling channel 40. In some embodiments, one or more of the nested cooling channels 40 have an internal heat transfer enhancement feature. In some embodiments, the internal heat transfer feature is one or more turbulators, one or more dimples, one or more grooves, or a combination thereof.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. A turbine component comprising:
   a root; and
   an airfoil extending from the root to a tip opposite the root, the airfoil forming a leading edge and a trailing edge portion extending to a trailing edge;
   wherein a plurality of nested cooling channels in the trailing edge portion of the airfoil permit passage of a cooling fluid from an interior of the turbine component to an exterior of the turbine component at the trailing edge portion; and
   wherein the airfoil comprises a first section and a second section, the first section and the second section being formed by metal three-dimensional printing and at least a portion of the plurality of nested cooling channels being formed at a surface of the first section or the second section.

2. The turbine component of claim 1, wherein the airfoil is formed of a high-temperature superalloy.

3. The turbine component of claim 2, wherein the second section is welded or brazed to the first section to form the airfoil.

4. The turbine component of claim 1, wherein the plurality of nested cooling channels have a nested geometry selected from the group consisting of wavy, zigzag, serpentine, sinusoidal, irregular, and combinations thereof.

5. A method of making a turbine component comprising:
   forming an airfoil having a leading edge, a trailing edge portion extending to a trailing edge, and a plurality of nested cooling channels in the trailing edge portion, each of the plurality of nested cooling channels fluidly connecting an interior of the turbine component with an exterior of the turbine component at the trailing edge portion;
   wherein the forming comprises metal three-dimensionally printing a first section and a second section of the airfoil, at least a portion of the plurality of nested cooling channels being formed at a surface of the first section or the second section.

6. The method of claim 5, wherein the metal three-dimensional printing comprises metal three-dimensional printing of a high-temperature superalloy to form the airfoil.

7. The method of claim 5, wherein the forming further comprises welding or brazing the first section to the second section to form the airfoil.

8. The method of claim 5, wherein the plurality of nested cooling channels have a geometry selected from the group consisting of wavy, zigzag, serpentine, sinusoidal, irregular, and combinations thereof.

9. A method of cooling a turbine component comprising:
   supplying a cooling fluid to an interior of the turbine component, the turbine component comprising:
      a root; and
      an airfoil extending from the root to a tip opposite the root, the airfoil forming a leading edge and a trailing edge portion extending to a trailing edge, the trailing edge portion having a plurality of nested cooling channels; and
   directing the cooling fluid through the plurality of nested cooling channels through the trailing edge portion of the airfoil, each of the plurality of nested cooling channels fluidly connecting the interior of the turbine component with an exterior of the turbine component at the trailing edge portion;
   wherein the airfoil comprises a first section and a second section, the first section and the second section being formed by metal three-dimensional printing and at least a portion of the plurality of nested cooling channels being formed at a surface of the first section or the second section.

10. The method of claim 9 further comprising operating a turbine comprising the turbine component.

11. The method of claim 9, wherein the airfoil is formed of a high-temperature superalloy.

12. The method of claim 11, wherein the second section is welded or brazed to the first section to form the airfoil.

13. The method of claim 9, wherein the plurality of nested cooling channels have a geometry selected from the group consisting of wavy, zigzag, serpentine, sinusoidal, irregular, and combinations thereof.

* * * * *